(No Model.)
J. W. STOCKETT.
ORDNANCE BREECH MECHANISM.
No. 601,177. Patented Mar. 22, 1898.
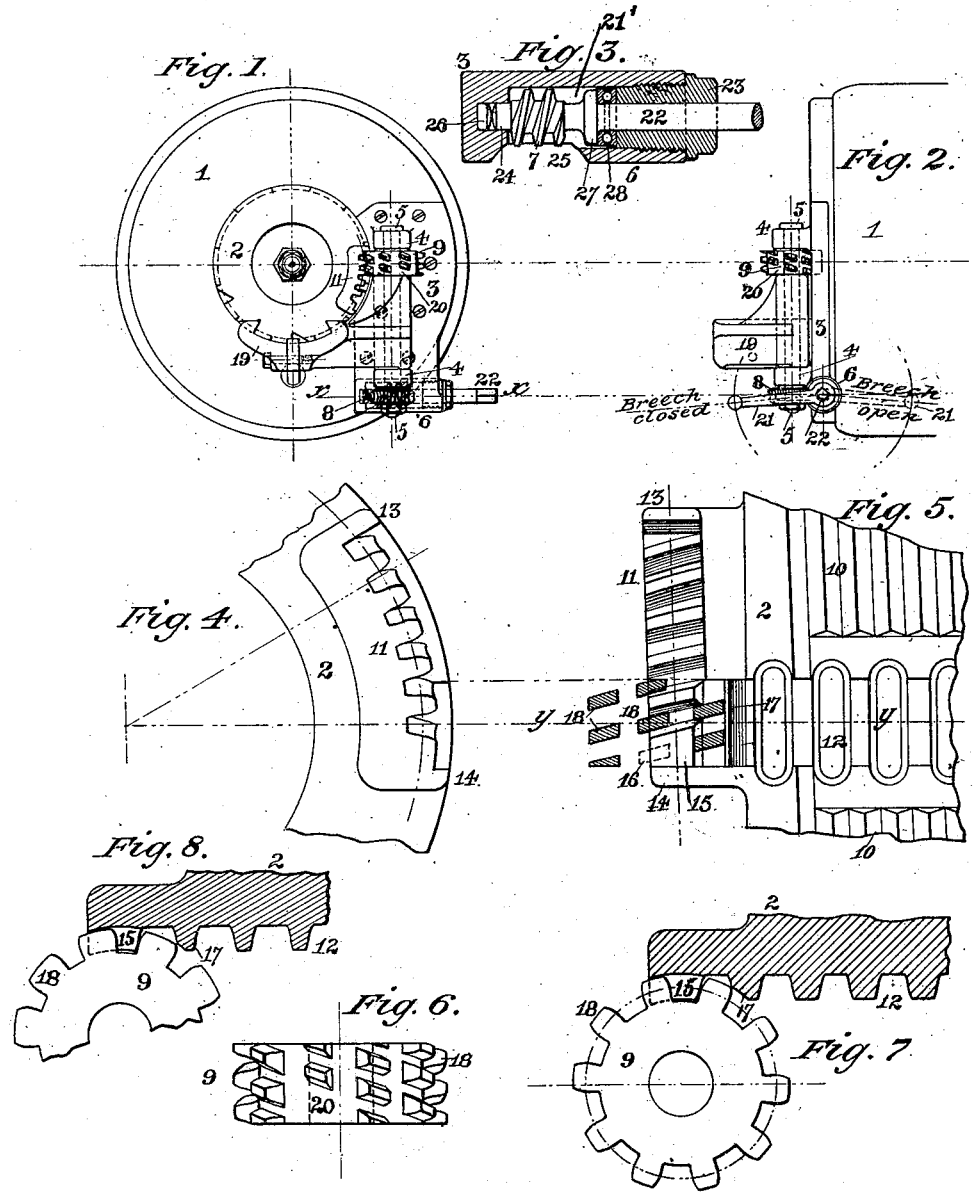
Witnesses:
Edwin K Lindy
B. G. Davis
Inventor:
John W. Stockett
by Fenelon B Brock
Atty

UNITED STATES PATENT OFFICE.

JOHN W. STOCKETT, OF WASHINGTON, DISTRICT OF COLUMBIA.

ORDNANCE BREECH MECHANISM.

SPECIFICATION forming part of Letters Patent No. 601,177, dated March 22, 1898.

Application filed November 6, 1897. Serial No. 657,677. (No model.)

*To all whom it may concern:*

Be it known that I, JOHN W. STOCKETT, of Washington, in the District of Columbia, have invented a new and useful Breech-Operating Mechanism for Ordnance; and I do declare the following to be a full, clear, and exact description of the invention, such as will enable others skilled in the art to which it appertains to make and use the same, reference being had to the figures marked on the accompanying drawings, which form a part of this specification.

My invention relates to breech-operating mechanism for ordnance.

The improvements consist in the following construction and combination of parts, the details of which will first be fully set forth and the features of novelty then pointed out and claimed.

Figure 1 is a rear elevation of a gun to which my improvements have been applied. Fig. 2 is a side elevation of a portion of a gun-breech. Fig. 3 is an enlarged detail section through the line $x\,x$ of Fig. 1. Fig. 4 is an enlarged detail end elevation of the rotating rack. Fig. 5 is a similar side elevation of the compound rack and a portion of the plug, with the intermeshing gear-teeth thereof projected graphically or diagrammatically over the rack to more clearly illustrate its action. Fig. 6 is an edge view of the compound gear. Fig. 7 is a side view of the compound gear and a section of a portion of the plug. Fig. 8 is a view similar to Fig. 7, showing a modified form of gear-teeth.

In the drawings, 1 represents the breech of a gun.

2 is the plug.

3 is a carrier let into a recess in the breech or jacket, upon which is mounted the plug-operating mechanism.

4 are bearings on the carrier-plate in which the hinge-pin or shaft 5 works.

6 are the bearings upon the lower end of the plate 3 within which the crank-shaft 22 works.

7 is a worm upon shaft 22, which meshes with a worm-gear 8 on the lower end of the hinge-pin 5.

9 is a compound worm and gear mounted on the upper end of the hinge-pin and fast thereon.

The worm-thread of the gear 9 is cut away or interrupted at regular intervals to form a series of spur-teeth, thus forming a compound gear.

The plug 2 is formed with the usual interrupted threads 10. I provide it also with a preferably integrally-formed segmental rotating rack 11 and a longitudinal translating-rack 12 upon the periphery of the plug.

13 and 14 are stops, respectively, at the outer and inner ends of the rack 11.

15 is a widened tooth or abutment at the inner end of the rack 11 at its juncture with rack 12.

One of the regular teeth on the side of the gear 9 is omitted at 20. It is more clearly shown in Fig. 6, and in Fig. 5 by dotted lines 16, showing where this tooth would be if not omitted.

Tooth 17 of the rack 12 is cut away in part to permit the free rotation of the teeth of gear 9.

The plug is shown locked in Fig. 1. When it is desired to unlock the plug, the gear 9 is rotated. The helical faces 18 of its teeth engage the rack 11, causing the plug to rotate until the threads 10 of the plug are unlocked. When the plug is fully unlocked and ready to be withdrawn from the breech, the rack 11 has been rotated to the point where the stop 14 engages the side of the gear 9. The engaging teeth of the gear are then in the position shown in Fig. 5. One of the gear-teeth has a full bearing against the widened or elongated tooth 15, and the space 20, where the omitted tooth of the gear would be if not removed, is indicated by the dotted lines 16. The elongated tooth 15 is thus permitted to enter that space in the rotation of the gear in both the opening and the closing of the breech. Now in the further rotation of the gear (the further rotation of the plug having been arrested by the stop 14) the spur-faces of the gear engage the tooth 15 and the teeth of the rack 12 and withdraw the plug upon the tray 19, where it is swung open upon the hinge-pin in the usual way. The initial linear withdrawal of the plug is also assisted by the impinging of the helical faces of the gear-teeth against the working faces of the rack-teeth 11.

The relation of the racks 11 and 12 with the gear 9 is such that the tooth or abutment 15 always comes into the space 20 during both the closing and opening movements of the plug.

It will be noticed that the crank-shaft 22 and crank 21 are disposed at the lower end of the hinge-pin and the gear 9 at the upper end. The gunner has the crank thus brought into a more advantageous position than where the crank was located at the upper end and can apply power thereto more effectively, especially in large guns.

By locating the crank at the lower end of the hinge-pin I am enabled to use any size of worm-wheel upon the hinge-pin and at the same time locate the compound gear at its proper position. Where the worm-wheel and crank are above the compound gear, there is not enough clearance for the use of a worm-wheel of sufficient diameter to easily operate large guns. If the hinge-pin be lengthened at its upper end to provide for the use of a large worm-wheel, the hinge-pin is correspondingly weakened and there is danger of its bending, especially in large guns, where the weight carried by the hinge-pin is very large. Besides, the gunner cannot operate the crank to advantage in such position. I have also devised the breech mechanism so that the crank 21 will always stand in substantial line with the length of the gun or slightly below said line when the breech is open and when the breech is closed.

If the crank stood, for example, at substantially right angles to the gun when the breech is closed, the recoil of the gun would cause an inertial rotary movement of the crank and a tendency at times to blow out the plug. This inertial movement is completely neutralized when the crank is in substantial line with the gun. In like manner when the breech is open any undue movement of the breech mechanism due to the crank standing transversely of the gun when it is being loaded is obviated.

In heavy ordnance the gun is elevated when being loaded and the breech correspondingly depressed. The tray when receiving the shell is swung away from the breech. In such position the heavy tray, due to the inclination of its hinge-pin, will close against the breech unless locked in its open position. This closing tendency is greatly augmented, obviously, when the shell is placed upon the tray with its added weight. The weight and gravity of the operating-crank through the intervening mechanism, when standing substantially in line with the gun, neutralizes the tendency of the tray to close or to start to close when the shell is placed thereon.

The bearing 6 at the lower end of the carrier-plate 3 is formed as shown in enlarged Fig. 3.

21' is a bored chamber which receives the crank-shaft 22. It is closed at its open end by a threaded bushing 23, forming a bearing for the crank-shaft.

24 is the bearing at the inner end of the shaft. Bearing 6 is cut away at 25 to provide for the proper meshing of worm 7 with the worm-gear 8.

To provide for the easy operation of shaft 22, a thrust button-block 26, having a convex face, is seated in bearing 6 at the inner end of the shaft, the latter being provided with a similar face bearing thereon.

27 is a collar on shaft 22, and 28 is a ball-bearing device interposed between the bushing 23 and the collar 27. These constitute the endwise bearings of this shaft.

Fig. 8 shows a modified construction of the gear 9 and rack 12. The helical faces of the gear-teeth are elongated and the intervening spaces correspondingly shortened. The rack 12 is cut, as shown, to intermesh with these gear-teeth. Greater security against rupture of the gear-teeth during the engagement of the helical faces of these teeth results from this construction.

The segmental rotating rack 11 upon the line of its length is parallel with the threads upon the plug, so that when the plug is rotated in the breech the tendency of the teeth of the compound gear in the rotating rack to jam, due to the resulting slight linear movement of the plug, is avoided.

Having thus described my invention, what I claim as new, and desire to secure by Letters Patent, is—

1. In a breech mechanism, a compound gear having an interrupted helical thread and an interrupted series of spur-teeth, and having one of the compound helical and spur teeth cut away.

2. In a breech mechanism, a gear provided with a series of compound helical and spur teeth having one of the compound helical and spur teeth cut away.

3. In a breech mechanism, a gear provided with a series of compound helical and spur teeth having one of the compound helical and spur teeth cut away, combined with a plug having a rotating and a translating rack.

4. In a breech mechanism, a gear provided with a series of compound helical and spur teeth having one of the compound helical and spur teeth cut away, combined with a plug provided with a segmental rack having an elongated tooth adapted to enter said cut-away portion, and a longitudinal translating-rack.

5. The combination in a gun, of a breech-plug, gearing for actuating said plug, and means for holding said plug in an open position, said means comprising the crank for said gearing when longitudinally disposed, as set forth.

6. The combination in a gun, a hinge-pin and crank-shaft mounted upon said gun, a gear fast upon the upper end of the hinge-pin, a worm-wheel fast upon the lower end of the hinge-pin, a worm upon the crank-shaft engaging said worm-wheel, a tray mounted upon the hinge-pin, and means for holding said tray in an open position, said means comprising the crank for operating the gearing when longitudinally disposed, as set forth.

7. The combination of a gun, a plug, a hinge-pin upon the gun, a gear upon the hinge-pin engaging the plug, a worm-wheel upon the hinge-pin, a crank-shaft upon the gun having a worm meshing with the worm-wheel and side and thrust bearings for the crank-shaft comprising a thrust-button at one end, a bushing at the other, and an intermediate collar and ball-bearing.

8. A breech-plug having a rotating rack and a translating-rack joining each other at an angle, the outer end of the tooth of the latter rack nearest the angle being cut away, the said rotating rack being parallel to the locking-threads on the breech-plug.

9. A breech-plug having a rotating rack and a translating-rack joining each other at an angle, the outer end of the tooth of the latter rack nearest the angle being cut away and the tooth at the angle of the racks being enlarged or elongated, the said rotating rack being parallel to the locking-threads on the breech-plug.

10. A gear provided with a series of compound helical and spur teeth having one of the compound helical and spur teeth cut away, combined with a plug provided with a segmental rack having an elongated tooth adapted to enter said cut-away portion, and a longitudinal translating-rack and a tooth of the longitudinal rack nearest its outer end cut away.

11. In a breech mechanism, a gear provided with a series of compound helical and spur teeth having one of the compound helical and spur teeth cut away and the helical faces of the teeth being wider than the spaces between the spur-faces of the teeth.

12. The combination of a gun, a plug having a longitudinal translating-rack and a segmental rack parallel with the screw-threads of the plug, and a gear mounted upon the gun having a series of compound helical and spur teeth having an open space at a point where one of said teeth would be formed, and means for operating said gear.

13. In a breech mechanism, a compound gear having an interrupted helical thread forming a lateral series of spur-teeth, having one of the teeth of a lateral series cut away.

14. The combination in a gun, of a breech-plug, gearing for actuating said plug, and means for holding said plug in an open and closed position, said means comprising the crank for said gearing when longitudinally disposed, as set forth.

15. In a gun, the combination of a breech-plug having a rotating rack and a translating-rack joining each other at an angle; and a hinge-pin having a pinion adapted to engage said racks, the outer end of the tooth of the translating-rack nearest the angle being cut concentric with the teeth of the pinion.

In testimony whereof I affix my signature in the presence of two witnesses.

JNO. W. STOCKETT.

Witnesses:
JNO. J. COOK,
EDWARD K. DE PUY.